No. 643,440. Patented Feb. 13, 1900.
L. H. ZEIGLER.
VEHICLE WHEEL.
(Application filed May 23, 1899.)
(No Model.) 3 Sheets—Sheet 1.

WITNESSES:
Donn Twitchell
H. L. Reynolds

INVENTOR
Lyman H. Zeigler
BY
ATTORNEYS

No. 643,440. Patented Feb. 13, 1900.
L. H. ZEIGLER.
VEHICLE WHEEL.
(Application filed May 23, 1899.)

(No Model.) 3 Sheets—Sheet 2.

WITNESSES:
Donn Twitchell
H. L. Reynolds.

INVENTOR
Lyman H. Zeigler
BY
ATTORNEYS

No. 643,440. Patented Feb. 13, 1900.
L. H. ZEIGLER.
VEHICLE WHEEL.
(Application filed May 23, 1899.)

(No Model.) 3 Sheets—Sheet 3.

WITNESSES:

INVENTOR

ATTORNEYS

UNITED STATES PATENT OFFICE.

LYMAN HALL ZEIGLER, OF MILLBANK, SOUTH DAKOTA.

VEHICLE-WHEEL.

SPECIFICATION forming part of Letters Patent No. 643,440, dated February 13, 1900.

Application filed May 23, 1899. Serial No. 717,905. (No model.)

*To all whom it may concern:*

Be it known that I, LYMAN HALL ZEIGLER, of Millbank, in the county of Grand and State of South Dakota, have invented a new and Improved Vehicle-Wheel, of which the following is a full, clear, and exact description.

My invention relates to an improvement in the construction of wheels, and is designed particularly for use on vehicles of the automobile type, although it may be used for wheels designed for any purpose.

My invention comprises the novel features hereinafter described and claimed.

Reference is to be had to the accompanying drawings, forming a part of this specification, in which similar characters of reference indicate corresponding parts in all the figures.

Figure 1:
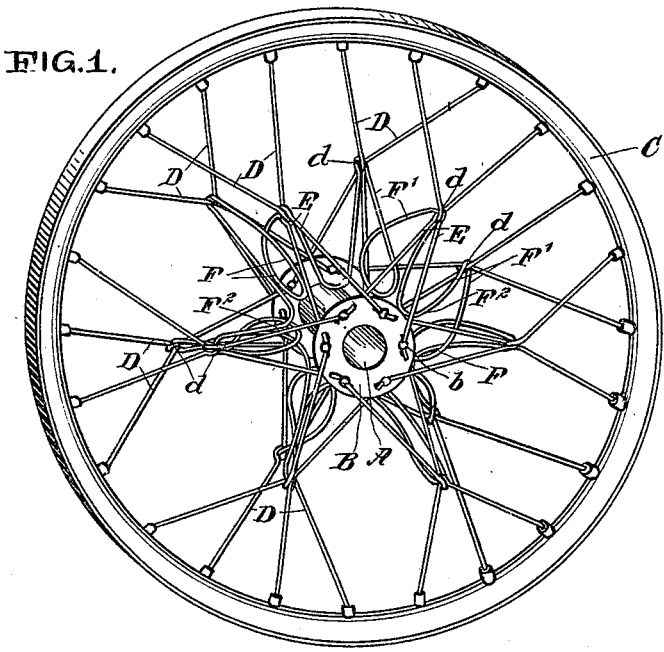
Figure 2:
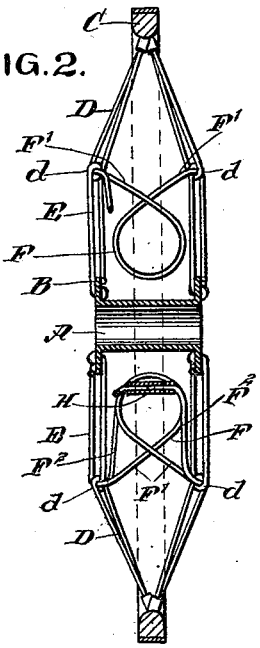
Figure 3:
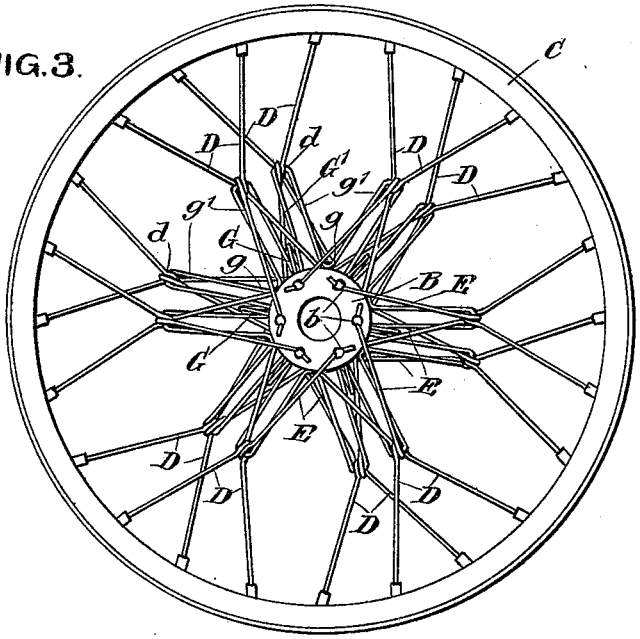
Figure 4:
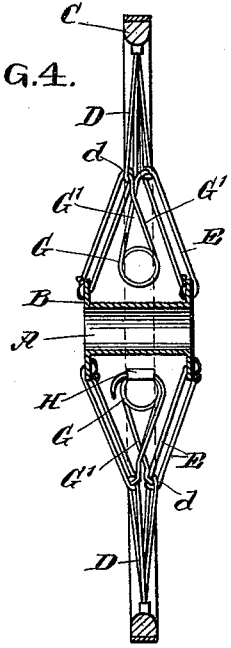
Figure 5:
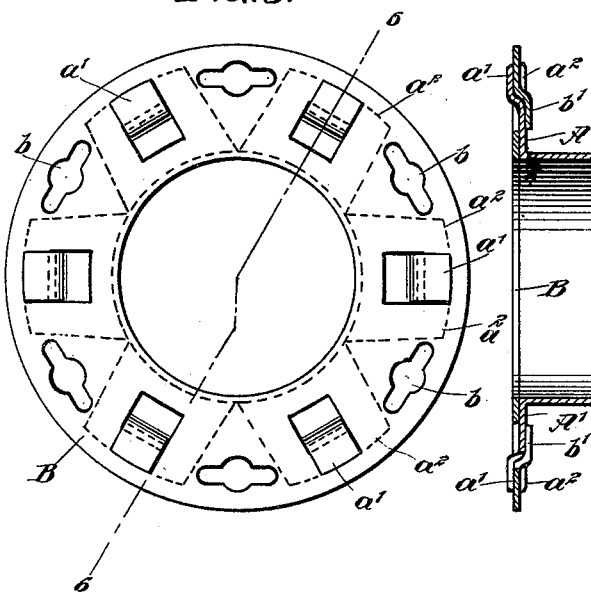
Figure 6:
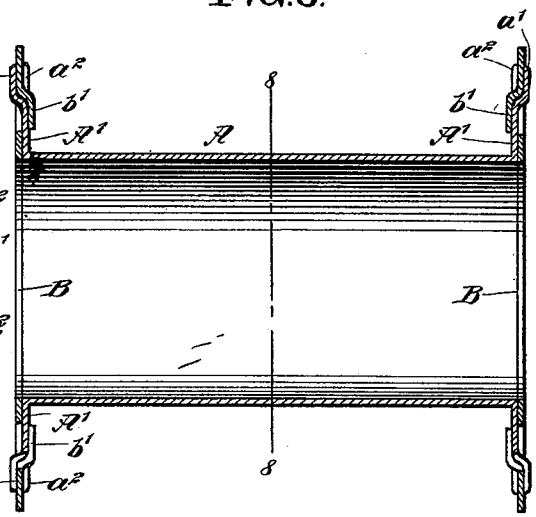
Figure 7:
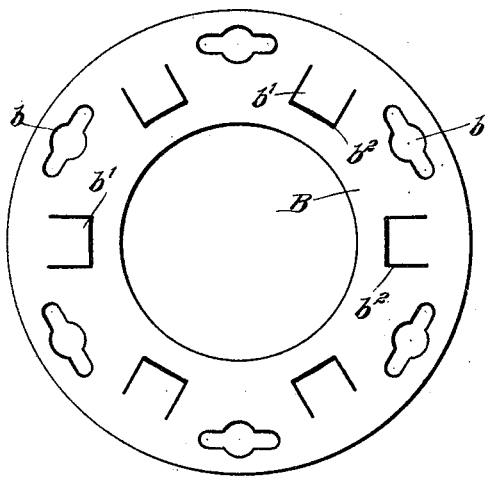
Figure 8:
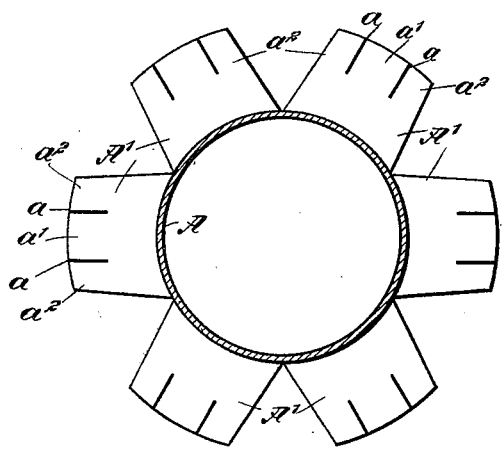
Figure 9:
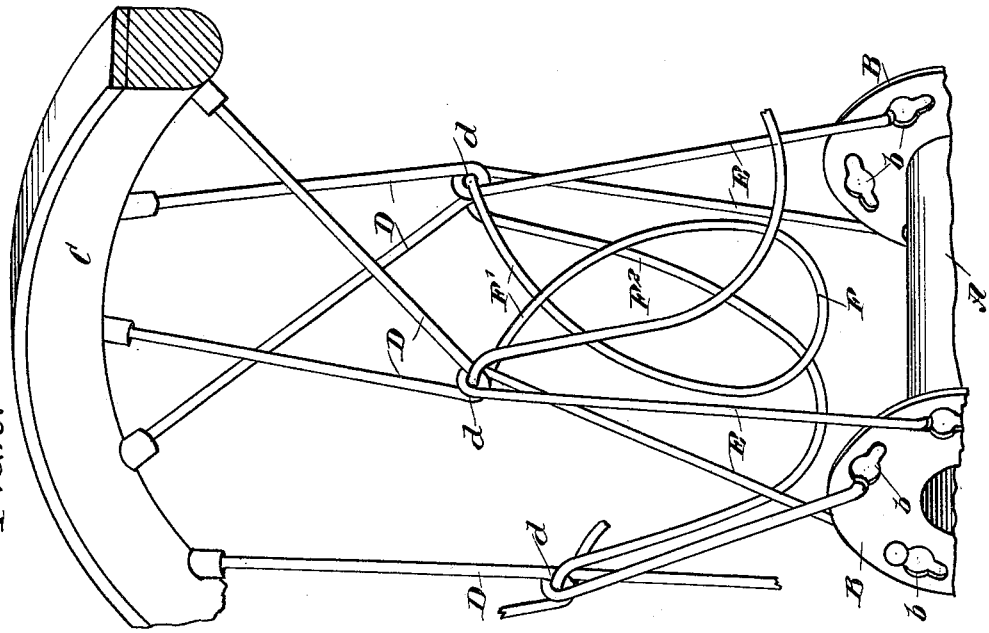

Figure 1 is a perspective view of one form of the wheel. Fig. 2 is a cross-sectional elevation of the same. Figs. 3 and 4 are respectively a side elevation and a cross-sectional elevation of a slightly-modified form of construction. Fig. 5 is an end elevation of the hub of the wheel. Fig. 6 is a cross-section of the same on the line 6 6 in Fig. 5. Fig. 7 is an elevation of the annular ring forming one of the flanges of the hub. Fig. 8 is a cross-section of the hub proper on the line 8 8 in Fig. 6; and Figs. 9 and 10 are perspectives showing, on a larger scale, small segments of the wheel, illustrating more fully the forms of the springs used.

The object of my invention is to produce a wheel which shall have a certain amount of elasticity, so that it may yield a little when brought in contact with inequalities in the road and which yet will have sufficient strength.

The two forms shown in Figs. 1 and 3 are the same in principle, although varying slightly in construction. In each of these forms tension-spokes are used, which are each formed in two sections, a rim and a hub section, said sections being pivoted to each other, so that there may be a slight hinging action transversely of the wheel. Each of these sections is formed as a loop or of a V shape, the apex of the V being in each case toward the center of the spoke and the ends of the spokes being attached, respectively, to the rim and the hub at points angularly removed from each other. The outer sections D are attached to the rim in any convenient manner. I have herein shown a nipple such as used for connecting spokes to the wooden rims of bicycles, although any manner of connection desired may be used. The two parts of the same spoke are represented in Figs. 1 and 3 by the lead-lines extending from a common reference letter to said parts. The inner sections E are similarly constructed, being of a V shape, the apex of the V interlocking with the apex of the outer or rim section D, and the ends of the inner or hub section being connected with the flanges of the hub at points angularly removed from each other. This forms a spoke which is free to have a slight swinging connection at its center in a direction transversely of the wheel. At this point in all of the spokes are connected certain arms of springs which extend entirely about the hub and are provided with spiral sections located just outside of the hub. These springs are formed of a single wire, which is bent in the proper shape to fit it for this purpose. The form shown in Figs. 1 and 2 has a loop or bend F located just outside of the hub and between the spokes and arms F', extending outwardly and having looped engagement with the hinge $d$ between the inner and outer sections of the spoke. This wire then extends toward the hub, forming a loop $F^2$, which is of a U shape. The wire is thus bent alternately into loops such as shown at F in Figs. 2 and 9, in which the arms cross each other, and loops such as shown at $F^2$, in which the loop is open or of U shape. These forms alternate in position as the spring extends about the hub, the outer ends of the arms F' being connected with the pivots $d$ of the spokes. The ends of the wire forming the spring are then joined by being inserted in a short section H of a tube sufficient in size to snugly hold the wire. The form of wheel shown in Figs. 1, 2, and 9 has its spring so formed as to press the hinged points $d$ outwardly or away from the central plane of the wheel. The springs should be of such strength as to hold the spokes pressed outwardly when the wheel is subjected to any normal weight. When, however, the weight upon the wheel is increased beyond the normal, the strain upon the spokes which extend horizontally from the hub is increased by the flattening of the wheel, thus drawing the spokes more nearly to a straight line than that shown in Fig. 2. When this happens, the strain of the spring is increased; but at the same time the effectiveness of this strain is also increased, due to the well-known fact that a slight lateral pressure applied to two hinged members of this character creates a greater longitudinal strain as the parts approach the straight line. The principle of action in this respect is exactly the same as that of the ordinary togglejoint. A somewhat similar action occurs when a side pressure is brought upon the wheel such as will tend to buckle it. In such an event the rim of the wheel will yield slightly sidewise, straightening the spokes upon one side and slightly buckling the spokes on the other side. In such an event the strain upon the spokes which are straightened is increased, thus furnishing greater resistance to the buckling of the wheel and a power which will draw the wheel back into its proper position as soon as the excess pressure thereon is removed.

Figure 10:
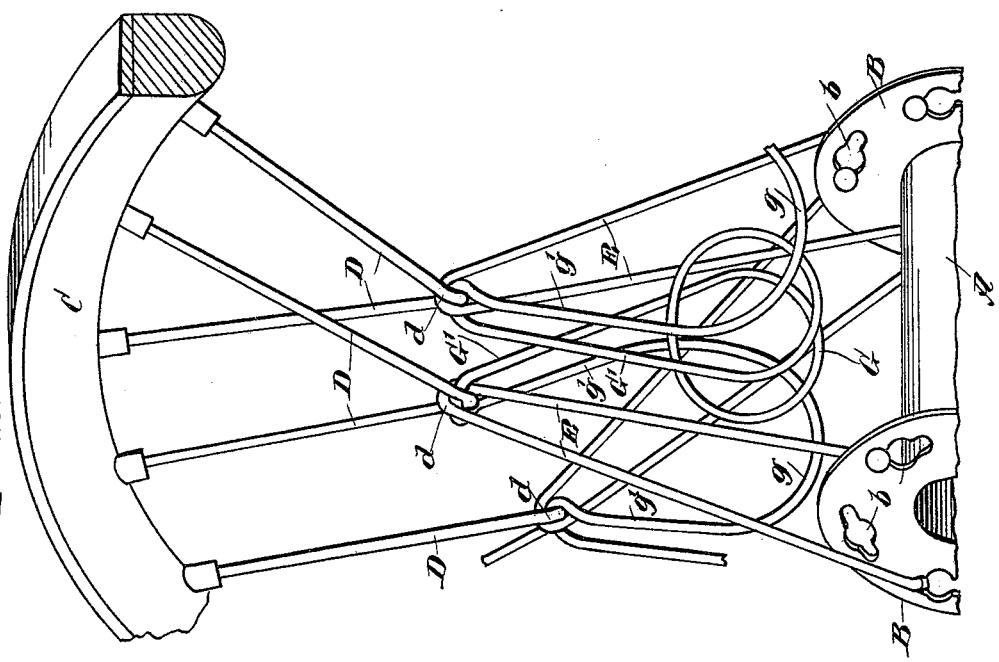

The construction of the wheel shown in Figs. 3, 4, and 10 is exactly similar to that shown in Figs. 1 and 2, with the single exception of the spring, which is of a different character and is applied differently. In this case the wire forming the spring has one or more complete spirals G, which lie just outside of the hub, and these are connected with the hinged points $d$ by means of radial arms G'. The spiral portions G of the hinge alternate with plain loops $g$, as clearly shown in Fig. 3, the loops $g$ being connected with the hinged points $d$ of the spokes by means of the radial arms $g'$. The ends of the wire forming this spring are connected with each other by means of a tube H similar to that shown in Fig. 2.

The wheel shown in Figs. 3, 4, and 10 differs from that shown in Figs. 1 and 2 by having the spring acting upon the hinged points $d$ in the spokes so as to draw them toward the center instead of forcing them away from the center, as is the case in Figs. 1 and 2. It is obvious that either form of spring shown in these drawings may be constructed so as to act upon the spokes to press them outwardly or to press them inwardly, as desired. The action in either case is substantially the same, the outer and inner sections of the spokes acting in the same manner as the two parts of a toggle-joint, the spring serving to supply the initial tension upon the spokes and to increase this tension as the spokes are straightened. The inner ends of the hubsections E of the spokes are connected to flanges B upon the wheel-hub A. These flanges extend radially from each end of the hub, and the spokes are connected therewith by having heads formed upon their inner ends, which pass through slots $b$ in the flanges.

The hub used in connection with this wheel is of peculiar construction and is illustrated in Figs. 5 to 8, inclusive. This hub consists of a cylinder A, the ends of which are slitted longitudinally, so as to form a series of sections A', which are then bent outwardly or into a radial position, forming lugs adapted to receive the annular plate B, which forms the flange. The lugs are in turn provided with two radially-extending slits $a$, which divide the outer end of the lug into a central section $a'$ and two outside sections $a^2$. The flanges are formed of annular plates B, which are provided with U-shaped slits $b^2$, the upper or open side of the U extending outwardly or away from the center. Each flange is also provided with the slots $b$, which are adapted to receive the ends of the spokes. The slits $b^2$ are the same in number as the lugs A' and are located so as to receive the central sections $a'$ of said lugs. The detached portion $b'$, formed by the U-shaped slit $b^2$, is bent to one side, and the central section $a'$ of the lug is also bent to one side, so that the two may be engaged in the manner shown in Fig. 6. These two sections may then be firmly secured to each other either by brazing or riveting, as desired, thus forming a firm joint between the hub and the flange. This hub is of such construction that it may be cheaply made and is well adapted for use with ordinary ball-bearings. Such bearings have not herein been shown, as any form of bearings may be used in connection with this hub. In fact, it may be used with other than ball-bearings. It is also obvious that other forms of springs than those shown may be used in the wheels to apply a side pressure to the hinged spokes.

Having thus fully described my invention, I claim as new and desire to secure by Letters Patent—

1. A wheel having spokes formed in hub and rim sections hinged to each other, and a spring connected with the spokes and exerting a sidewise strain thereon, substantially as described.

2. A wheel having spokes formed in plural sections hinged together, and springs exerting a side strain on said spokes to normally deflect them from a straight line, substantially as described.

3. A wheel having tension-spokes, and springs exerting a side strain upon the spokes to normally deflect them from a straight line, substantially as described.

4. A wheel, comprising hub and rim having connecting tension-spokes composed of hub and rim sections, each section being formed of a V-shaped rod having its ends secured to either rim or hub, as the case may be, the complementary sections being interlocked, and a spring surrounding the hub and having a series of coils connected by radiating loops or arms which are connected by their outer ends with the joints in the spokes, said springs exerting a sidewise strain upon the spokes, substantially as described.

5. A wheel, comprising hub and rim having connecting tension-spokes composed of hub and rim sections, each section being formed of a V-shaped rod having its ends secured to either rim or hub, as the case may be, the complementary sections being interlocked and springs exerting a sidewise strain upon the spokes, substantially as described.

6. A wheel-hub, comprising a cylinder having its ends slitted and turned outward forming radial lugs, said lugs also having two radial slits extending inward from their ends, and a flange for each end of the hub, consisting of a ring or annular plate having U-shaped slits formed therein with the top of the U outward, and each adapted to receive one section of one of the slitted lugs, substantially as described.

7. A wheel-hub, comprising a cylinder having its ends slitted and turned outward forming radial lugs, said lugs also having two radial slits extending inward from their ends, and a flange for each end of the hub consisting of a ring or annular plate having U-shaped slits formed therein with the top of the U outward, and each adapted to receive one section of one of the slitted lugs and also having spoke-head-receiving slots alternating with the U-slots, substantially as described.

8. A wheel-hub, comprising a cylinder having its ends slitted and turned outward to form radial lugs, and end flanges formed of a ring or annular plate, the lugs and flanges being slitted forming interlocking members, substantially as described.

9. A wheel having a hub, comprising a cylinder having its ends slitted and turned outward to form radial lugs, and end flanges formed of a ring or annular plate, the lugs and flanges being slitted forming interlocking members, and also having spoke-head-receiving slots alternating with the U-slits, a rim, and tension-spokes connecting rim and hub and each composed of hub and rim sections, each section being formed of a V-shaped rod having its ends secured to either rim or hub, as the case may be, the complementary sections being interlocked, and springs exerting a sidewise strain upon the spokes, substantially as described.

LYMAN HALL ZEIGLER.

Witnesses:
S. J. CHENOWETH,
H. C. GIST.